(12) United States Patent
Matsumoto et al.

(10) Patent No.: US 10,281,346 B2
(45) Date of Patent: May 7, 2019

(54) MAGNETOSTRICTIVE SENSOR

(71) Applicant: YAMAHA HATSUDOKI KABUSHIKI KAISHA, Iwata-shi, Shizuoka (JP)

(72) Inventors: Hiroshi Matsumoto, Iwata (JP); Satomi Ishikawa, Iwata (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 0 days.

(21) Appl. No.: 15/941,638

(22) Filed: Mar. 30, 2018

(65) Prior Publication Data
US 2018/0224342 A1 Aug. 9, 2018

Related U.S. Application Data

(63) Continuation-in-part of application No. PCT/JP2016/079157, filed on Sep. 30, 2016.

(30) Foreign Application Priority Data

Oct. 1, 2015 (JP) .................................. 2015-196279

(51) Int. Cl.
G01L 3/10 (2006.01)
(52) U.S. Cl.
CPC ................ G01L 3/102 (2013.01); G01L 3/10 (2013.01)
(58) Field of Classification Search
CPC . G01L 3/102; G01L 3/10; G01L 1/125; G01L 23/223; G01L 23/145; G01L 1/00; H01L 41/12; H01L 41/125

USPC ................. 73/862.333, 578, 862.69
See application file for complete search history.

(56) References Cited

U.S. PATENT DOCUMENTS

| 5,280,729 A | 1/1994 | Aoki et al. |
| 5,491,369 A * | 2/1996 | Ishino ..................... G01L 3/102 310/26 |
| 6,301,976 B1 | 10/2001 | Bogdanov |
| 6,341,534 B1 | 1/2002 | Dombrowski |
| 6,412,356 B1 | 7/2002 | Kouketsu et al. |

(Continued)

FOREIGN PATENT DOCUMENTS

| JP | H04-024530 A | 1/1992 |
| JP | H07-55602 A | 3/1995 |

(Continued)

*Primary Examiner* — Lisa M Caputo
*Assistant Examiner* — Suman K Nath
(74) *Attorney, Agent, or Firm* — Rabin & Berdo, P.C.

(57) ABSTRACT

A magnetostrictive sensor capable of obtaining both enhanced productivity and reduced variations in outputs can be obtained. A torque sensor includes a substrate and a plating film disposed on the outer peripheral surface of the substrate. The substrate includes a plating portion, masking portions, and tilt portions and. An outer peripheral surface of the plating portion is a surface parallel to a shaft center of the substrate in a side cross-sectional view. Outer peripheral surfaces of the tilt portions are slopes tilted relative to the shaft center in the side cross-sectional view. The plating film is formed on a plating surface and slopes in such a manner that end portions in the axial direction are located on the slopes. The plating film on the slopes has a thickness smaller than the thickness of the plating film on the plating surface.

7 Claims, 10 Drawing Sheets

(56) References Cited

U.S. PATENT DOCUMENTS

| | | | |
|---|---|---|---|
| 2002/0189372 A1* | 12/2002 | Wallin | ............... G01L 3/102 73/862.333 |
| 2004/0226384 A1 | 11/2004 | Shimizu et al. | |
| 2008/0066295 A1 | 3/2008 | Shimizu et al. | |
| 2008/0257635 A1 | 10/2008 | Shimizu et al. | |
| 2008/0314163 A1* | 12/2008 | Harata | ............... G01L 3/102 73/862.333 |
| 2009/0249893 A1* | 10/2009 | Ling | ............... G01L 3/102 73/862.333 |

FOREIGN PATENT DOCUMENTS

| | | |
|---|---|---|
| JP | H10-176966 A | 6/1998 |
| JP | H11-287718 A | 10/1999 |
| JP | H11-344394 A | 12/1999 |
| JP | 2005-003622 A | 1/2005 |
| JP | 4936969 B2 | 5/2012 |

* cited by examiner

MAGNETOSTRICTIVE SENSOR

CROSS-REFERENCES TO RELATED APPLICATIONS

The present application is a continuation-in-part application of International Application No. PCT/JP2016/079157, filed on Sep. 30, 2016, and having the benefit of the earlier filing date of Japanese Application No. 2015-196279, filed on Oct. 1, 2015. The content of the each of the identified applications is incorporated herein by reference in its entirety.

TECHNICAL FIELD

The present teaching relates to a magnetostrictive sensor.

BACKGROUND ART

A magnetostrictive sensor has been conventionally used for detecting a torque acting on a component of equipment or detecting a load acting on the component. A known configuration example of the magnetostrictive sensor includes: a columnar substrate having an outer peripheral surface on which a magnetostrictive portion is provided; and a detection coil that generates a magnetic flux passing through the magnetostrictive portion. In the case of using the magnetostrictive sensor having such a configuration as a torque sensor, when a force in a rotation direction is applied to the substrate, a tensile stress or a compressive stress occurs in the magnetostrictive portion. Accordingly, the magnetic permeability of the magnetostrictive portion changes. The torque sensor detects a change in the magnetic permeability of the magnetostrictive portion using the detection coil to thereby detect a force acting on the substrate.

For example, an amorphous thin strap or a plating film can be used as the magnetostrictive portions. In the case of using an amorphous thin strap as the magnetostrictive portion, the sensitivity of the magnetostrictive sensor can be increased. In the case of using the amorphous thin strap as the magnetostrictive portion, the amorphous thin strap needs to be bonded to the outer peripheral surface of the substrate with an adhesive. To accurately bond the amorphous thin strap to the outer peripheral surface of the substrate, the adhesive needs to be uniformly applied onto the outer peripheral surface of the substrate. It is, however, difficult to uniformly apply the adhesive onto the outer peripheral surface of the substrate. In addition, if an inappropriate amount of the adhesive is used, for example, the adhesive is likely to extend off between the amorphous thin strap and the substrate in bonding the amorphous thin strap to the substrate. In this case, a process for removing the excess adhesive is needed. In addition, since the amorphous thin strap is thin, it is difficult to use the amorphous thin strap with an industrial robot. In view of these circumstances, in the case of using the amorphous thin strap as the magnetostrictive portion, it is difficult to enhance productivity.

From the viewpoint of productivity, the use of a plating film as the magnetostrictive portion is conceivable. In the case of forming a plating film by electroplating, as disclosed in Patent Document 1, for example, the substrate is immersed in a plating solution with a predetermined portion of the substrate masked with a masking member. Thereafter, a current is caused to flow in the plating solution so that a plating film is formed in an unmasked portion of the substrate.

CITATION LIST

Patent Document

Patent Document 1: Japanese Patent No. 4936969

SUMMARY OF INVENTION

Technical Problem

When the shape of plating films (e.g., distribution of film thickness) varies in mass-producing magnetostrictive sensors, outputs of the magnetostrictive sensors also vary. To reduce the occurrence of variations in outputs of the magnetostrictive sensors, plating films need to be formed with high reproducibility in order to prevent variations in the shape of the plating films. In this case, the masking needs to be controlled with high accuracy.

In the case of mass-producing magnetostrictive sensors, however, it is difficult to mask substrates with high accuracy for various reasons, such as a dimensional error in substrates, a dimensional error in the masking members, and degradation of the masking members with time. Thus, it is difficult to suppress occurrence of variations in outputs of magnetostrictive sensors. It is also difficult to sufficiently enhance productivity of magnetostrictive sensors.

It is therefore an object of the present teaching to provide a magnetostrictive sensor capable of obtaining both enhanced productivity and suppressed variations in outputs.

SOLUTION TO PROBLEM

The inventors of the present teaching studied the formation of a plating film by electroplating and found that, in some cases, the thickness of the plating film increases in an end portion thereof (a portion to come into contact with a masking member during the formation). It was found that in such cases, a magnetic flux generated by, for example, a detection coil and passing through the end portion of the plating film become nonuniform, resulting in the occurrence of variations in outputs of magnetostrictive sensors.

It was also found that, in some cases, a variation also occurs in thickness distribution of the plating film in the circumferential direction of the substrate. In this case, the amount of a magnetic flux passing through the plating film varies depending on a rotation angle of the substrate relative to the detection coil, for example. Accordingly, even in a state where a force in the rotation direction does not act on the substrate (i.e., under no load), the value of a current flowing in the detection coil varies depending on the rotation angle of the substrate. Consequently, an output of a magnetostrictive sensor under no load varies depending on the rotation angle of the substrate, and thus, accuracy in detection by the magnetostrictive sensor decreases.

In view of this, the inventors intensively studied the thickness of the plating film to find that the thickness of the end portion of the plating film increases and/or thickness distribution varies in the end portion of the plating film in a case where the masking is insufficiently controlled in forming the plating film.

Further study by the inventors found that a reduction of the thickness of the end portion of the plating film can stabilize an output of the magnetostrictive sensor. Specifically, it was found that when the thickness of the end portion of the plating film is reduced, unevenness of a magnetic flux passing through the end portion can be reduced. In addition, it was found that even when the shape of the end portion of the plating film varies, variations in the amount of the magnetic flux passing through the end portion depending on the rotation angle of the substrate can be reduced. It was also found to be possible to reduce variations in the amount of the magnetic flux passing through the plating film depending on the rotation angle of the substrate accordingly.

The inventors further found that the thickness of the end portion of the plating film can be reduced by causing a portion of the outer peripheral surface of the substrate where the end portion of the plating film is located to tilt relative to the shaft center of the substrate.

Based on the foregoing findings, the inventors arrived at a configuration of a magnetostrictive sensor described below.

A magnetostrictive sensor according to an embodiment of the present teaching includes: a substrate having a columnar or tubular shape, the substrate includes a first base portion, a second base portion, and a tilt portion disposed between the first base portion and the second base portion in an axial direction of the substrate and connecting the first base portion and the second base portion, the substrate further includes a shaft center extending axially along a center of the substrate in a side cross-sectional view of the substrate; and a plating film disposed on an outer peripheral surface of the substrate, wherein, the first base portion has an outer peripheral surface parallel to the shaft center of the substrate, the tilt portion has an outer peripheral surface that is a slope tilted relative to the shaft center in the side cross-sectional view, the plating film is formed on the outer peripheral surface of the first base portion and on the slope in such a manner that one end of the plating film in the axial direction is located on the slope, and the plating film has a thickness on the slope smaller than a thickness of the plating film on the outer peripheral surface of the first base portion.

Advantageous Effects of Invention

A magnetostrictive sensor according to an embodiment of the present teaching can obtain both enhancement of productivity and reduction of variations in outputs.

DESCRIPTION OF EMBODIMENTS

A magnetostrictive sensor according to an embodiment of the present teaching will now be described. A magnetostrictive torque sensor will be hereinafter described as a magnetostrictive sensor according to an embodiment of the present teaching.

(Schematic Configuration of Torque Sensor)

Figure 1:
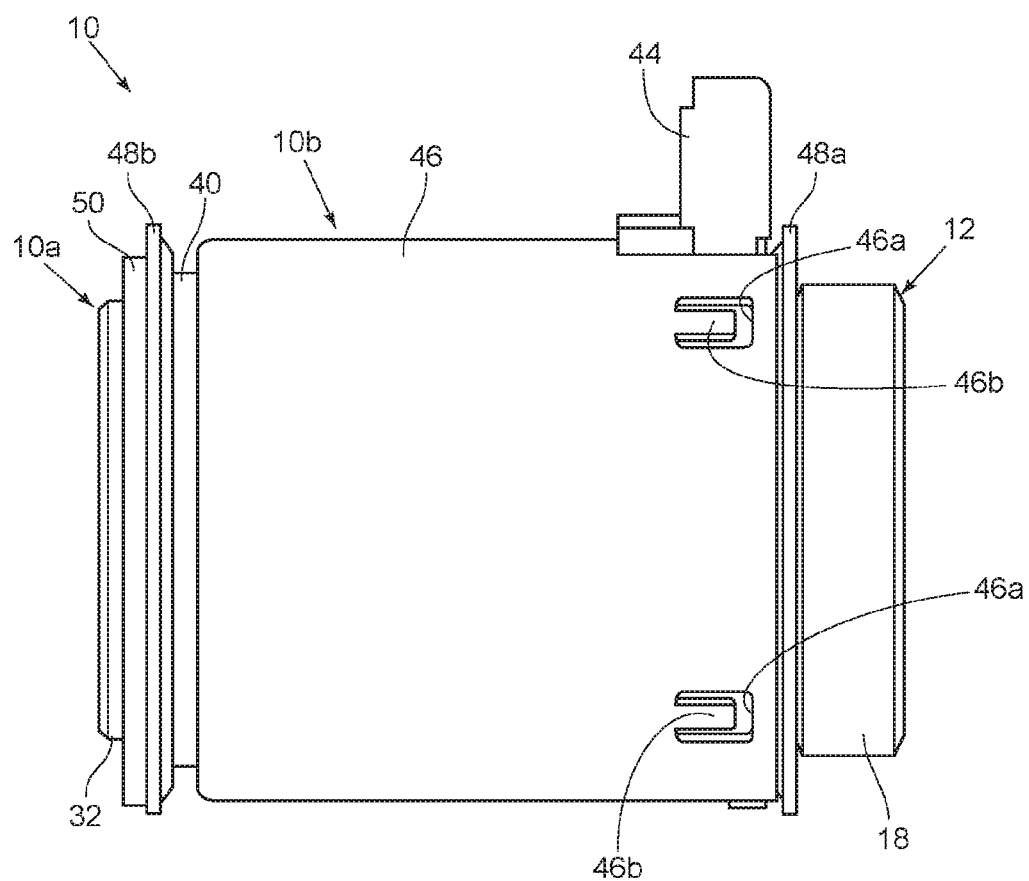
FIG. 1 is a front view illustrating a schematic configuration of a torque sensor according to an embodiment of the present teaching.
Figure 2:
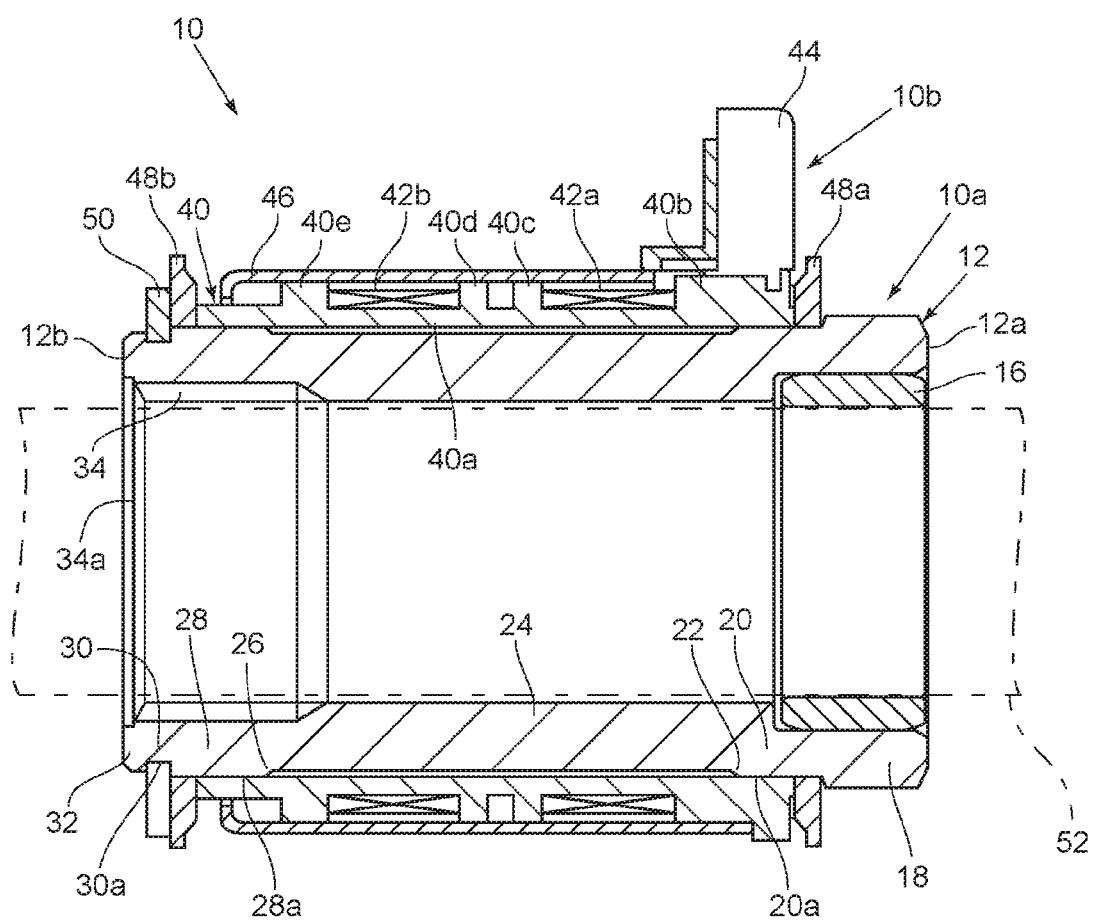
FIG. 2 is a vertical cross-sectional view illustrating the schematic configuration of the torque sensor illustrated in FIG. 1 in cross-section.

FIG. 1 is a front view illustrating a schematic configuration of a torque sensor 10 according to an embodiment of the present teaching. FIG. 2 is a vertical cross-sectional view illustrating the schematic configuration of the torque sensor 10 in cross-section.

With reference to FIGS. 1 and 2, the torque sensor 10 includes a magnetostrictive unit 10a and a detection unit 10b. Each of the magnetostrictive unit 10a and the detection unit 10b has a substantially tubular shape. The magnetostrictive unit 10a is rotatably inserted in the detection unit 10b, which will be described in detail later. In the torque sensor 10, a torque acts on a substrate 12 described later of the magnetostrictive unit 10a so that the magnetic permeability of a plating film 14 (see FIG. 3) described later of the magnetostrictive unit 10a thereby changes. The change in the magnetic permeability of the plating film 14 is detected by a pair of detection coils 42a and 42b described later of the detection unit 10b. In this manner, the torque acting on the substrate 12 is detected. Although not specifically described, the torque sensor 10 can be used, for example, as a torque sensor for detecting a pedaling force in a driving device of an electric motor-assisted bicycle.

(Configuration of Magnetostrictive Unit)

Figure 3:
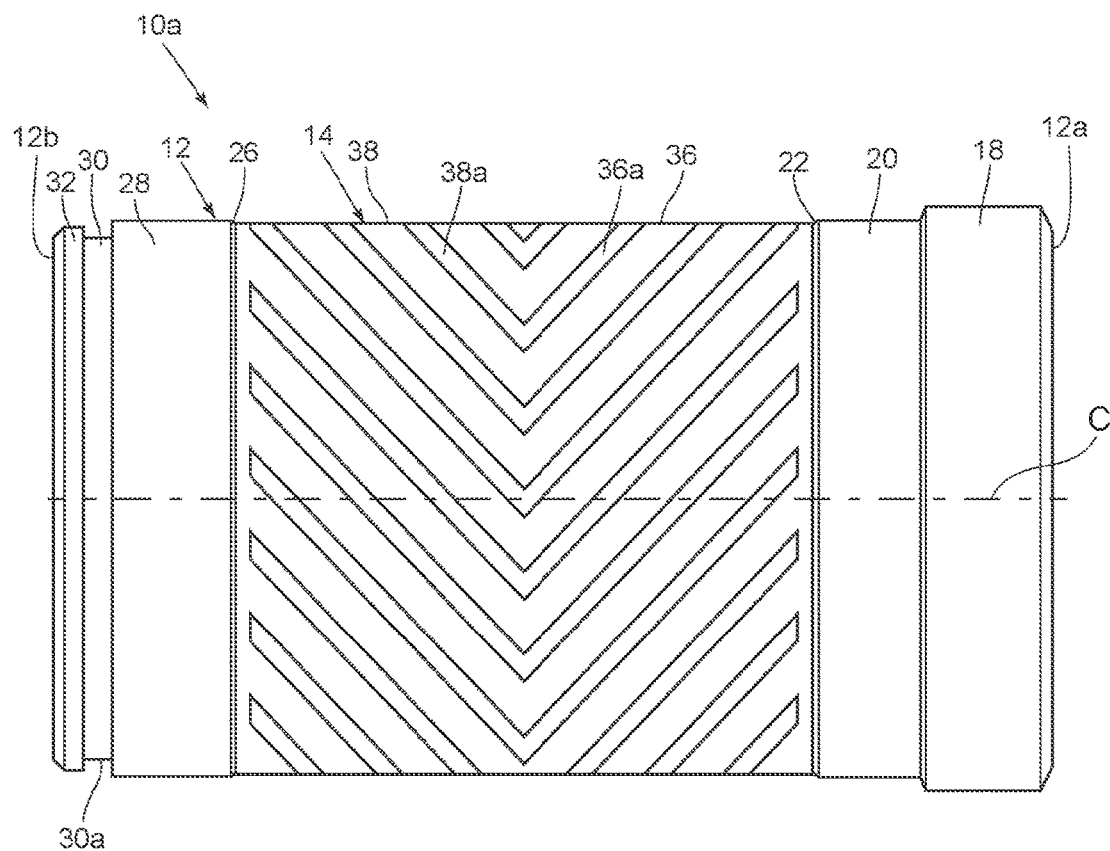
FIG. 3 is a front view illustrating a magnetostrictive unit.
Figure 4:
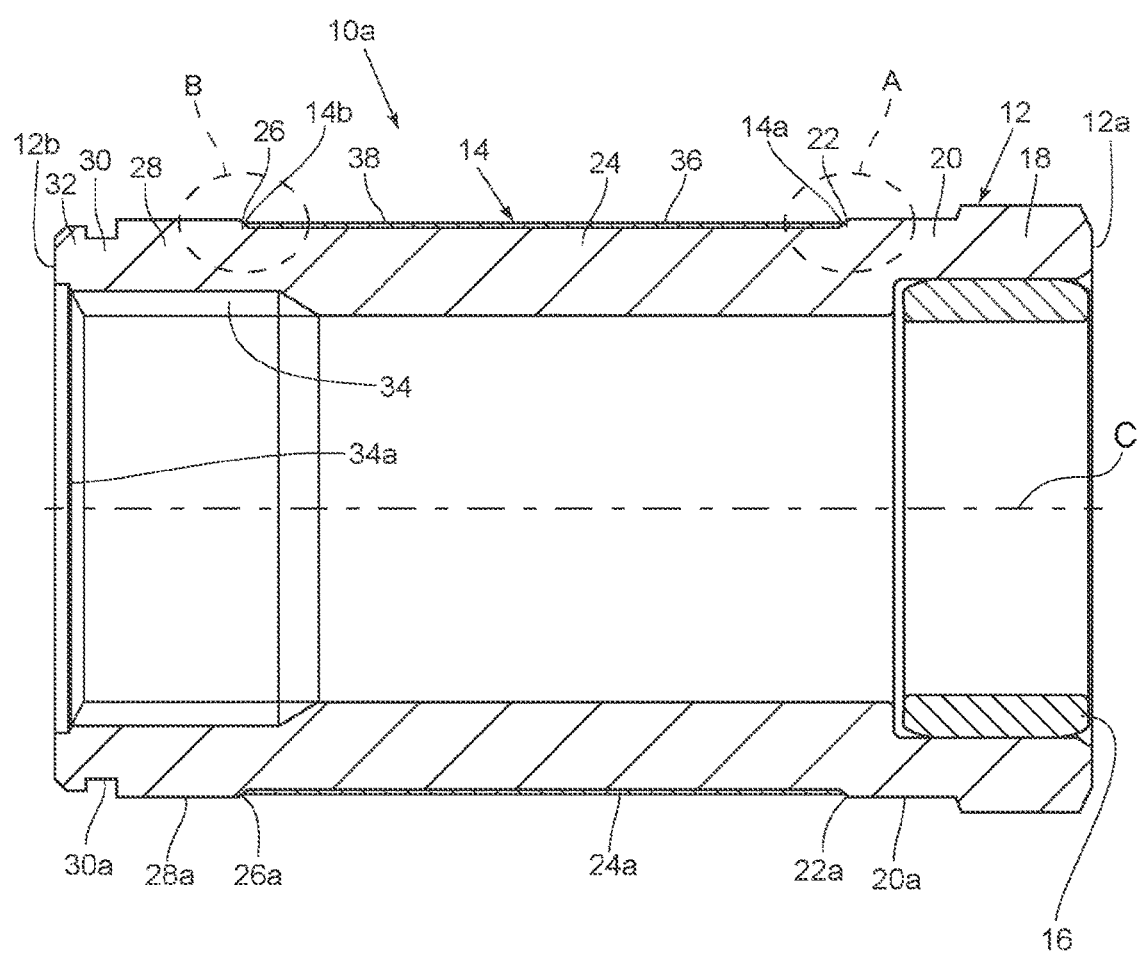
FIG. 4 is a vertical cross-sectional view illustrating the magnetostrictive unit illustrated in FIG. 3 in cross-section.
Figure 5:
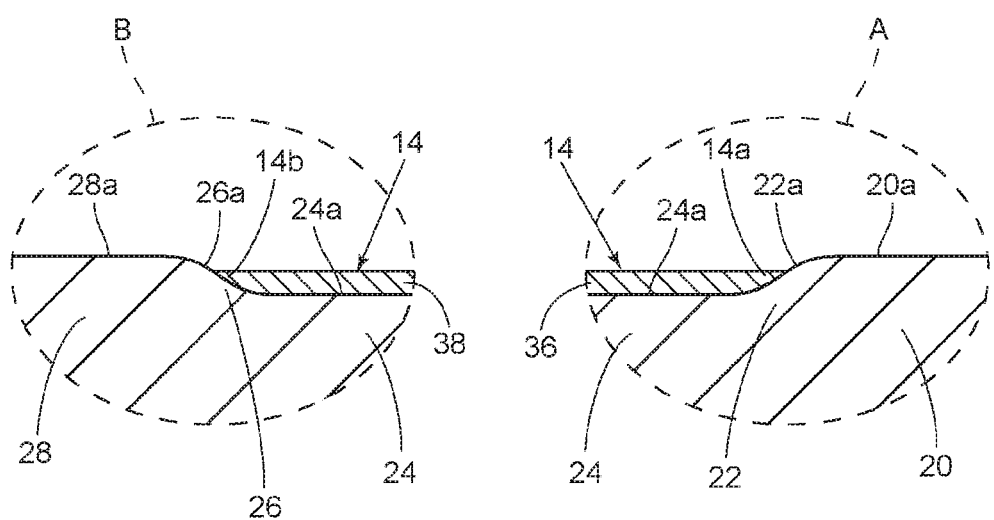
FIG. 5 shows enlarged views illustrating portions surrounded by broken lines in FIG. 4 in an enlarged manner

First, a configuration of the magnetostrictive unit 10a will be described. FIG. 3 is a front view illustrating the magnetostrictive unit 10a. FIG. 4 is a vertical cross-sectional view illustrating the magnetostrictive unit 10a in cross-section. FIG. 5 shows enlarged views illustrating portions A and B surrounded by broken lines in FIG. 4 in an enlarged manner.

With reference to FIGS. 3 and 4, the magnetostrictive unit 10a includes the tubular substrate 12, the plating film 14 disposed on the outer peripheral surface of the substrate 12, and an annular bearing member 16 fitted in an end portion of the substrate 12. FIG. 2 does not show the plating film 14 to simplify the illustration.

With reference to FIGS. 3 and 4, the substrate 12 includes a flange portion 18, a support portion 20, a tilt portion 22, a plating portion 24 (first base portion), a tilt portion 26, a support portion 28, a holding portion 30, and a flange portion 32, from one end 12a to the other end 12b of the substrate 12 in an axial direction.

Although not specifically shown, a spline groove is formed on the outer peripheral surface of the flange portion 18 to extend in the axial direction of the substrate 12. With reference to FIGS. 1 and 2, the flange portion 18 projects from the detection unit 10b in the axial direction of the detection unit 10b in a state where the magnetostrictive unit 10a is inserted in the detection unit 10b.

With reference to FIG. 4, an outer peripheral surface 20a of the support portion 20 is a surface parallel to a shaft center C of the substrate 12 (see a chain line in FIG. 4) in a cross-section of the substrate 12 including the shaft center C and extending in the axial direction of the substrate 12 (hereinafter referred to as a vertical cross-section or a side cross-section of the substrate 12). Similarly, each of an outer peripheral surface 24a of the plating portion 24 and an outer peripheral surface 28a of the support portion 28 is a surface parallel to the shaft center C of the substrate 12 in the vertical cross-section of the substrate 12. In the present specification and claims, the term shaft center C of the substrate 12 refers to a center line C extending along an axial length of a center of the substrate 12, as seen from a side cross-sectional view of the substrate 12, such as in FIG. 4. The plating portion 24 has a diameter smaller than the diameter of the support portion 20. The plating portion 24 has a diameter smaller than the diameter of the support portion 28. In this embodiment, the support portions 20 and 28 correspond to a second base portion, and the outer peripheral surface 24a corresponds to the outer peripheral surface of the first base portion. In this embodiment, each of the support portions 20 and 28 has a diameter smaller than the diameter of the flange portion 18 (spline outer diameter).

With reference to FIGS. 4 and 5, the tilt portion 22 is disposed between the support portion 20 and the plating portion 24 in the axial direction of the substrate 12, and connects the support portion 20 and the plating portion 24 to each other. An outer peripheral surface 22a of the tilt portion 22 is a slope tilted relative to the shaft center of the substrate 12 in the vertical cross-section of the substrate 12. In this embodiment, the diameter of the tilt portion 22 gradually decreases from the support portion 20 toward the plating portion 24. Accordingly, in the vertical cross-section of the substrate 12, the outer peripheral surface 22a tilts relative to the shaft center of the substrate 12 radially inward in the substrate 12 from the outer peripheral surface 20a toward the outer peripheral surface 24a.

The tilt portion 26 is disposed between the support portion 28 and the plating portion 24 in the axial direction of the substrate 12, and connects the support portion 28 and the plating portion 24 to each other. An outer peripheral surface 26a of the tilt portion 26 is a slope tilted relative to the shaft center of the substrate 12 in the vertical cross-section of the substrate 12. In this embodiment, the diameter of the tilt portion 26 gradually decreases from the support portion 28 toward the plating portion 24. Accordingly, in the vertical cross-section, the outer peripheral surface 26a tilts relative to the shaft center of the substrate 12 radially inward in the substrate 12 from the outer peripheral surface 28a toward the outer peripheral surface 24a.

With reference to FIG. 5, a connection portion between the outer peripheral surface 22a and the outer peripheral surface 20a and a connection portion between the outer peripheral surface 22a and the outer peripheral surface 24a have curved shapes in the vertical cross-section of the substrate 12. Similarly, a connection portion between the outer peripheral surface 26a and the outer peripheral surface 28a and a connection portion between the outer peripheral surface 26a and the outer peripheral surface 24a have curved shapes in the vertical cross-section of the substrate 12.

With reference to FIGS. 3 and 4, the holding portion 30 has a diameter smaller than each of the diameter of the support portion 28 and the diameter of the flange portion 32. In this manner, a groove 30a is formed between the support portion 28 and the flange portion 32.

With reference to FIGS. 2 and 4, a spline groove 34 is formed on the inner peripheral surface of the substrate 12 to extend in the axial direction of the substrate 12. In FIGS. 2 and 4, the spline groove 34 is simplified. The spline groove 34 is formed closer to the other end 12b than the center of the substrate 12 in the axial direction of the substrate 12. In this embodiment, a front end 34a of the spline groove 34 (an end toward the other end 12b in the axial direction of the substrate 12) is located closer to the inside of the substrate 12 than the other end 12b in the axial direction of the substrate 12. That is, the spline groove 34 is formed closer to the inside of the substrate 12 than the other end 12b in the axial direction of the substrate 12.

The thickness of the substrate 12 is larger in a center portion of the substrate 12 than in end portions of the substrate 12 in the axial direction thereof. With reference to FIG. 2, in this embodiment, the thickness of the substrate 12 in portions facing a pair of detection coils 42a and 42b described later is larger than the thickness of end portions of the substrate 12.

The substrate 12 is made of, for example, a metal material (e.g., chromium molybdenum steel). In this embodiment, the substrate 12 is produced by, for example, forging and machining Specifically, for example, first, a metal material cut out from a metal wire material to have a predetermined length is forged, and thereby, a hollow member is obtained. The spline groove 34 and the spline groove in the flange portion 18 described above are shaped by the forging. Next, the forged member is subjected to thermal refining (e.g., hardening and tempering), and then, the outer peripheral surface of the member is cut by machining (e.g., turning). In this manner, the outer peripheral surfaces 20a, 22a, 24a, 26a, and 28a having predetermined shapes are formed, and the substrate 12 is obtained.

With reference to FIG. 3, the plating film 14 is made of a magnetostrictive material (e.g., a Fe—Ni alloy) and functions as a magnetostrictive portion. The plating film 14 is formed by, for example, electroplating. With reference to FIGS. 4 and 5, the plating film 14 is formed on the outer peripheral surface 24a of the plating portion 24 and the outer peripheral surfaces 22a and 26a of the tilt portions 22 and 26 to have a tubular shape. In this embodiment, one end 14a of the plating film 14 is located on the outer peripheral surface 22a, and the other end 14b of the plating film 14 is located on the outer peripheral surface 26a. The thickness of the plating film 14 on the outer peripheral surface 22a and the thickness of the plating film 14 on the outer peripheral surface 26a are smaller than the thickness of the plating film 14 on the outer peripheral surface 24a. The thickness of the plating film 14 on the outer peripheral surface 22a, the thickness of the plating film 14 on the outer peripheral surface 26a, and the thickness of the plating film 14 on the outer peripheral surface 24a respectively refer to an average thickness of the plating film 14 on the outer peripheral surface 22a, an average thickness of the plating film 14 on the outer peripheral surface 26a, and an average thickness of the plating film 14 on the outer peripheral surface 24a.

With reference to FIG. 3, in this embodiment, the plating film 14 includes a magnetostrictive portion 36 and a magnetostrictive portion 38. The magnetostrictive portion 36 includes a plurality of slits 36a. The magnetostrictive portion 38 includes a plurality of slits 38a. The plurality of slits 36a are arranged at regular intervals in the circumferential direction of the substrate 12. Similarly, the plurality of slits 38a are arranged at regular intervals in the circumferential direction of the substrate 12.

When viewed from outside in the radial direction of the substrate 12, the slits 36a are tilted 45° relative to the shaft center of the substrate 12. When viewed from outside in the radial direction of the substrate 12, the slits 38a are tilted 45° in a direction different from the slits 36a relative to the shaft center of the substrate 12. That is, in this embodiment, the plurality of slits 36a and 38a are formed in the plating film 14 in such a manner that the slits 36a and the slits 38a intersect with each other perpendicularly. With this configuration, when a torque acts on the substrate 12, a compressive stress occurs in one of the magnetostrictive portions 36 and 38, and a tensile stress occurs in the other magnetostrictive portion. FIGS. 4 and 5 do not show the plurality of slits 36a and 38a.

With reference to FIGS. 2 and 4, the bearing member 16 is made of, for example, a metal material. The bearing member 16 is press fitted in the substrate 12 from the one end 12a of the substrate 12.

(Configuration of Detection Unit)

With reference to FIGS. 1 and 2, the detection unit 10b includes a bobbin 40, a pair of detection coils 42a and 42b, a connector 44, a case 46, a pair of protective plates 48a and 48b, and a circlip 50.

The bobbin 40 is made of, for example, a resin material. With reference to FIG. 2, the bobbin 40 has a substantially tubular shape. Specifically, the bobbin 40 includes a tubular portion 40a and a plurality of (four in this embodiment) flange portions 40b through 40e projecting from the outer peripheral surface of the tubular portion 40a outward in the radial direction of the tubular portion 40a. The flange portions 40b through 40e are arranged at intervals from one another in the axial direction of the tubular portion 40a.

The detection coil 42a is wound around the tubular portion 40a between the flange portion 40b and the flange portion 40c. The detection coil 42b is wound around the tubular portion 40a between the flange portion 40d and the flange portion 40e. In this embodiment, for example, the detection coils 42a and 42b include welded layers. In the detection coils 42a and 42b, adjacent coil wires are fixed to each other by self-welding. The detection coils 42a and 42b may not include welded layers. In this case, adjacent coil wires may be fixed to each other with another technique such as impregnation.

Although not specifically described, the flange portion 40b is provided with a plurality of terminals electrically connected to the detection coils 42a and 42b. To protect these terminals, a connector 44 is attached to the flange portion 40b. These plurality of terminals are electrically connected to terminals of an unillustrated control board. The control board is provided with an arithmetic circuit. The arithmetic circuit calculates a torque acting on the substrate 12 based on changes in the impedances of the detection coils 42a and 42b, for example.

With reference to FIGS. 1 and 2, the case 46 is made of, for example, a metal material such as low-carbon steel. The case 46 has a tubular shape. With reference to FIG. 2, the bobbin 40 is inserted in the case 46. The case 46 covers radially outsides of the detection coils 42a and 42b.

With reference to FIG. 1, one end portion of the case 46 has a plurality of substantially U-shaped through holes 46a. The formation of the through holes 46a forms substantially rectangular swaging portions 46b. In this embodiment, the plurality of swaging portions 46b are formed at regular intervals in the circumferential direction of the case 46. The case 46 is fixed to the bobbin 40 by swaging using the plurality of swaging portions 46b.

With reference to FIGS. 1 and 2, each of the protective plates 48a and 48b has an annular shape. Each of the protective plates 48a and 48b is made of, for example, a resin material. The protective plate 48a is disposed between one end surface of the bobbin 40 and the flange portion 18 of the substrate 12. The protective plate 48b is disposed between the other end surface of the bobbin 40 and the circlip 50. In this embodiment, the protective plate 48a is provided to prevent abrasion of the one end surface of the bobbin 40. The protective plate 48a is provided to prevent abrasion of the other end surface of the bobbin 40. The circlip 50 has a substantially C-shape, and is fitted in the groove 30a of the substrate 12. In this embodiment, the circlip 50 is made of a metal material. The circlip 50 is disposed to prevent the bobbin 40 and the protective plates 48a and 48b from moving in the axial direction of the substrate 12 relative to the substrate 12.

(Relationship Between Magnetostrictive Unit and Detection Unit)

With reference to FIG. 2, in attaching the detection unit 10b to the magnetostrictive unit 10a, the protective plate 48a is fitted in the substrate 12 from the other end 12b of the substrate 12, for example. Next, the bobbin 40, the detection coils 42a and 42b, the connector 44, and the case 46 that are integrally formed are fitted in the substrate 12 from the other end 12b of the substrate 12. Thereafter, the protective plate 48b is fitted in the substrate 12 from the other end 12b of the substrate 12. Lastly, the circlip 50 is fitted in the groove 30a. In this manner, attachment of the detection unit 10b to the magnetostrictive unit 10a is completed.

In this embodiment, in the substrate 12, the outer peripheral surface 20a of the support portion 20 and the outer peripheral surface 28a of the support portion 28 are rotatably supported on the inner peripheral surface of the bobbin 40. The bobbin 40 covers the plating film 14 from radially outside of the substrate 12 not to contact the plating film 14 (see FIG. 3). The detection coils 42a and 42b are disposed at positions facing the plating film 14 in the radial direction of the substrate 12. More specifically, in the radial direction of the substrate 12, the detection coil 42a is disposed at a position facing the magnetostrictive portion 36, and the detection coil 42b is disposed at a position facing the magnetostrictive portion 38. In this embodiment, the substrate 12 is directly supported on the inner peripheral surface of the bobbin 40 as described above. Alternatively, the substrate 12 may be indirectly supported on the inner peripheral surface of the bobbin 40 with a ring-shaped bearing member or another member interposed therebetween.

(Examples of Application of Torque Sensor)

The torque sensor 10 according to this embodiment can be used, for example, as a torque sensor for detecting a pedaling force in a driving device of an electric motor-assisted bicycle. In this case, with reference to FIG. 2, a crank shaft 52 of the electric motor-assisted bicycle is inserted in the substrate 12. Specifically, the crank shaft 52 is inserted in the substrate 12 in such a manner that a spline groove (not shown) formed on the outer peripheral surface of the crank shaft 52 and the spline groove 34 on the inner peripheral surface of the substrate 12 mesh with each other. In this manner, a torque can be transferred from the crank shaft 52 to the substrate 12.

The flange portion 18 of the substrate 12 is, for example, connected to a chain sprocket (not shown) of the electric motor-assisted bicycle through a one-way clutch. The detection unit 10b (more specifically the bobbin 40, for example) is fixed to a housing of the driving device (not shown) by using an unillustrated fixing member.

In the configuration described above, when a torque is transferred from the crank shaft 52 to the substrate 12, a compressive stress occurs in the magnetostrictive portion 36 and a tensile stress occurs in the magnetostrictive portion 38, for example. In this manner, the magnetic permeability of the magnetostrictive portion 36 decreases, and the magnetic permeability of the magnetostrictive portion 38 increases. Consequently, an impedance of the detection coil 42a decreases, and an impedance of the detection coil 42b increases. Based on changes in the impedances of the detection coils 42a and 42b, the torque sensor 10 can detect a torque acting on the substrate 12.

(Example of Method for Forming Plating Film)

Figure 6:
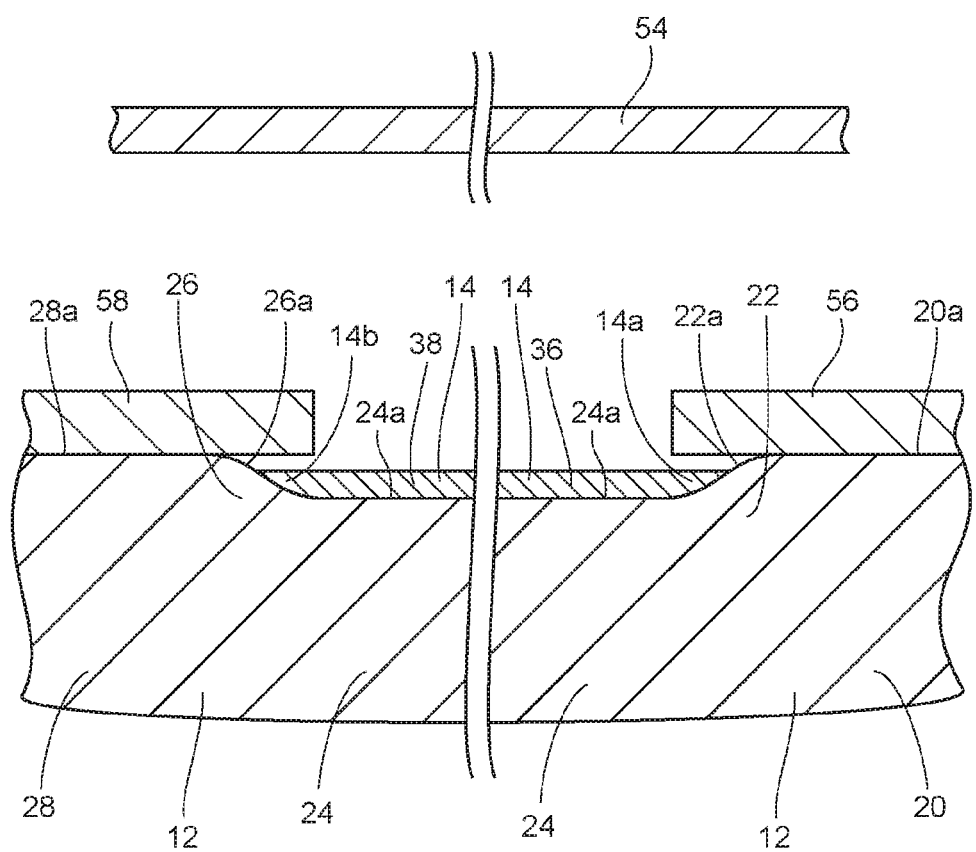
FIG. 6 is a view for describing an example of a method for forming a plating film.

A method for forming the plating film 14 will be briefly described below. FIG. 6 is a view for describing an example of a method for forming the plating film 14. The method for forming the plating film 14 is not limited to the following examples, and the plating film 14 may be formed by using various known methods.

With reference to FIG. 6, in forming the plating film 14, an electrode 54 is disposed radially outside the substrate 12 in a plating solution, for example. Masking members 56 and 58 are used to mask outer peripheral surfaces (masking surfaces) 20a and 28a of the support portions 20 and 28. In the example of FIG. 6, in the axial direction of the substrate 12, a front end portion of the masking member 56 projects toward the outer peripheral surface 22a relative to a connection portion between the outer peripheral surface 20a and the outer peripheral surface 22a. In the axial direction of the substrate 12, a front end portion of the masking member 58 projects toward the outer peripheral surface 26a relative to a connection portion between the outer peripheral surface 28a and the outer peripheral surface 26a. Although not shown, in forming the plating film 14, the flange portion 18, the holding portion 30, and the flange portion 32 are also masked with the masking members 56 and 58.

After the electrode 54 and the masking members 56 and 58 are disposed as described above, a potential difference is generated between the electrode 54 and the substrate 12. Accordingly, a plating film 14 is formed on the outer peripheral surface of the substrate 12 by metal ions in the plating solution. In the example of FIG. 6, since the outer peripheral surfaces 20a and 28a are masked with the masking members 56 and 58, the plating film 14 is formed on the outer peripheral surfaces 22a, 24a, and 26a.

Advantages of Embodiments

In the torque sensor 10, the tilt portion 22 is disposed between the plating portion 24 (first base portion) and the support portion (second base portion) 20, and is connected to the plating portion 24 and the support portion 20. The tilt portion 26 is disposed between the plating portion 24 (first base portion) and the support portion (second base portion) 28, and is connected to the plating portion 24 and the support portion 28. The plating portion 24 has a diameter smaller than the diameter of each of the support portions 20 and 28. The diameters of the tilt portions 22 and 26 gradually decrease from the support portions 20 and 28 toward the plating portion 24. With this configuration, in the case of forming the plating film 14 as illustrated in FIG. 6, for example, a space that gradually narrows toward the support portion 20 is formed between the front end portion of the masking member 56 and the outer peripheral surface 22a. Similarly, a space that gradually narrows toward the support portion 28 is formed between the front end portion of the masking member 58 and the outer peripheral surface 26a. In this case, in forming the plating film 14, the amount of metal ions supplied to the outer peripheral surfaces 22a and 26a decreases toward the support portions 20 and 28. In this manner, the thickness of the plating film 14 formed on the outer peripheral surfaces 22a and 26a also decreases toward the support portions 20 and 28. Consequently, without masking the substrate 12 with high accuracy in order to control the thicknesses of the end portions 14a and 14b of the plating film 14, the thicknesses of the end portions 14a and 14b can be easily made smaller than the thickness of the plating film 14 on the outer peripheral surface 24a of the plating portion 24. The thicknesses of the end portions 14a and 14b of the plating film 14 refer to averages of the thicknesses of the plating film 14 in the end portions 14a and 14b, respectively. The thickness of the plating film 14 on the outer peripheral surface 24a of the plating portion 24 refers to an average thickness of the plating film 14 on the outer peripheral surface 24a of the plating portion 24.

Since the thicknesses of the end portions 14a and 14b of the plating film 14 are small as described above, in generating a magnetic flux by the detection coils 42a and 42b, for example, it is possible to reduce unevenness of magnetic fluxes passing through the end portions 14a and 14b. In addition, since the thicknesses of the end portions 14a and 14b of the plating film 14 are small, even when the shape of the end portions 14a and 14b varies, it is possible to reduce variations in the amount of magnetic fluxes passing through the end portions 14a and 14b of the plating film 14 depending on the rotation angle of the substrate 12. In this manner, it is possible to reduce variations in the amount of the magnetic fluxes passing through the plating film 14 depending on the rotation angle of the substrate 12. As a result, an output of the torque sensor 10 can be stabilized.

Accordingly, in this embodiment, without masking the substrate 12 with high accuracy in forming the plating film 14, the occurrence of variations in outputs of the torque sensor 10 can be suppressed. That is, both enhancement of productivity and reduction of variations in outputs of the torque sensor 10 can be achieved.

In the torque sensor 10, a connection portion between the outer peripheral surface 22a of the tilt portion 22 and the outer peripheral surface 20a of the support portion 20 has a curved shape in the vertical cross-section of the substrate 12. Similarly, a connection portion between the outer peripheral surface 26a of the tilt portion 26 and the outer peripheral surface 28a of the support portion 28 has a curved shape in the vertical cross-section of the substrate 12. Here, in a cutting process of the substrate 12, in some cases, minute burrs can occur in the connection portions. In such cases, even when the connection portions are covered with the masking members 56 and 58, since a current intensively flows in the burrs in forming the plating film 14, the burrs might be plated. In such a case that the burrs are plated, the burrs enlarged by plating might damage components (e.g., the bobbin 40) of the torque sensor 10. However, since the connection portions have curved shapes in the vertical cross-section of the substrate 12, the occurrence of burrs in the connection portions in cutting the substrate 12 can be prevented. In this manner, damage of components of the torque sensor 10 can be prevented.

In the torque sensor 10, the bobbin 40 covers the plating film 14 from radially outside of the substrate 12. Accordingly, the plating film 14 can be protected by the bobbin 40. In the substrate 12, the outer peripheral surfaces 20a and 28a are rotatably supported on the inner peripheral surface of the bobbin 40. In this manner, contact between the plating film 14 and the bobbin 40 can be prevented. Consequently, damage of the plating film 14 can be prevented.

Other Embodiments

In the substrate 12 of the magnetostrictive unit 10a described above, the diameter of the plating portion 24 (first base portion) is smaller than the diameters of the support portions (second base portion) 20 and 28. The shape of the substrate, however, is not limited to the example described above. For example, the diameter of the plating portion (first base portion) may be larger than the diameter of the support portion (second base portion). A torque sensor 60 having such a configuration will be briefly described below.

Figure 7:
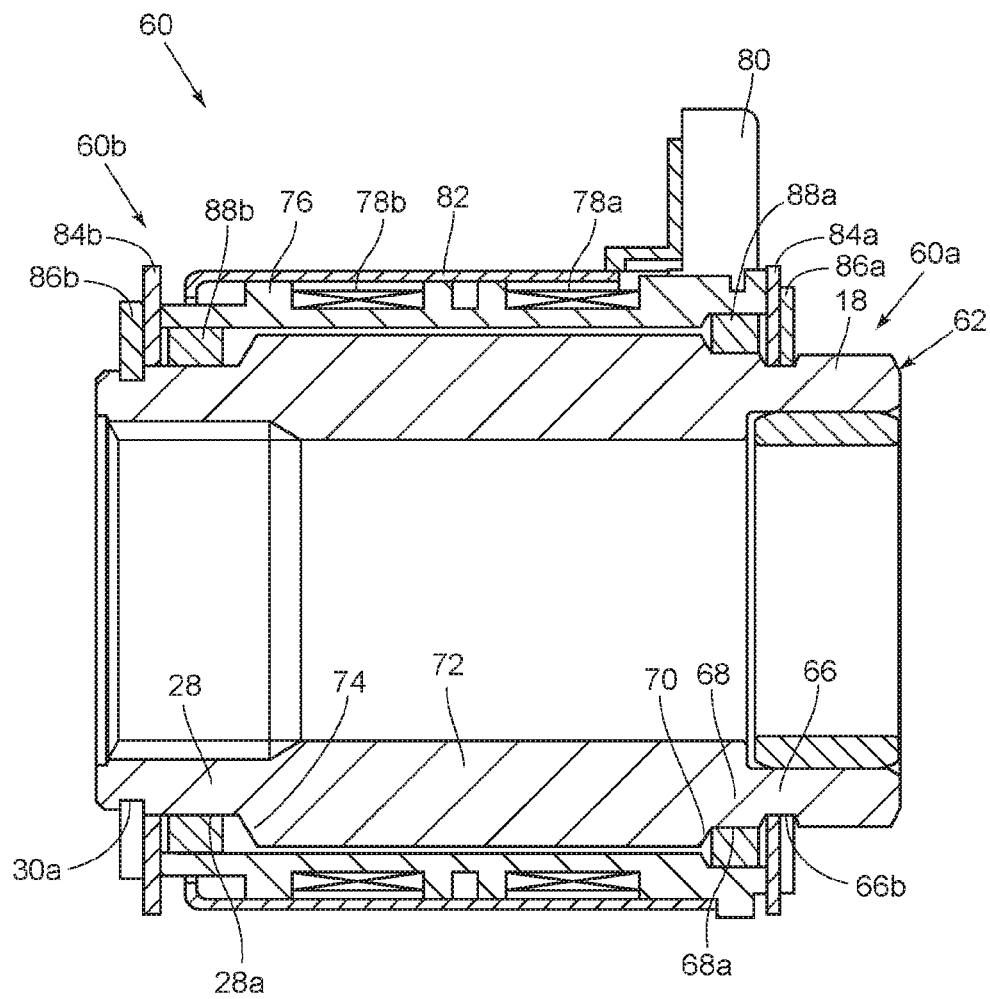
FIG. 7 is a vertical cross-sectional view illustrating a schematic configuration of a torque sensor according to another embodiment in cross-section.

FIG. 7 is a vertical cross-sectional view illustrating a schematic configuration of the torque sensor 60 according to another embodiment of the present teaching in cross-section. The torque sensor 60 includes a magnetostrictive unit 60a and a detection unit 60b. The torque sensor 60 will now be briefly described mainly for aspects different from the torque sensor 10 described above. FIG. 7 does not show a plating film 64 described later in order to simplify the illustration.

Figure 8:
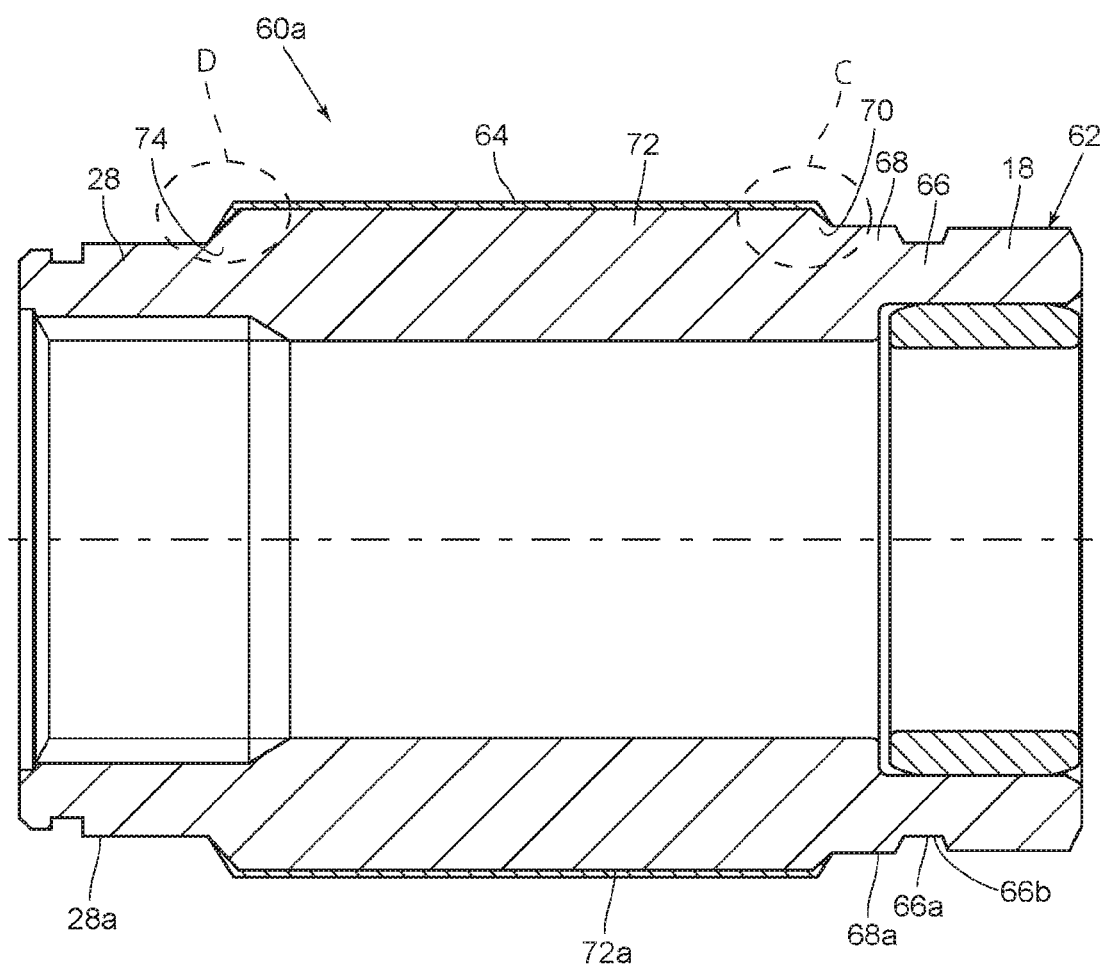
FIG. 8 is a vertical cross-sectional view illustrating another example of the magnetostrictive unit in cross-section.
Figure 9:
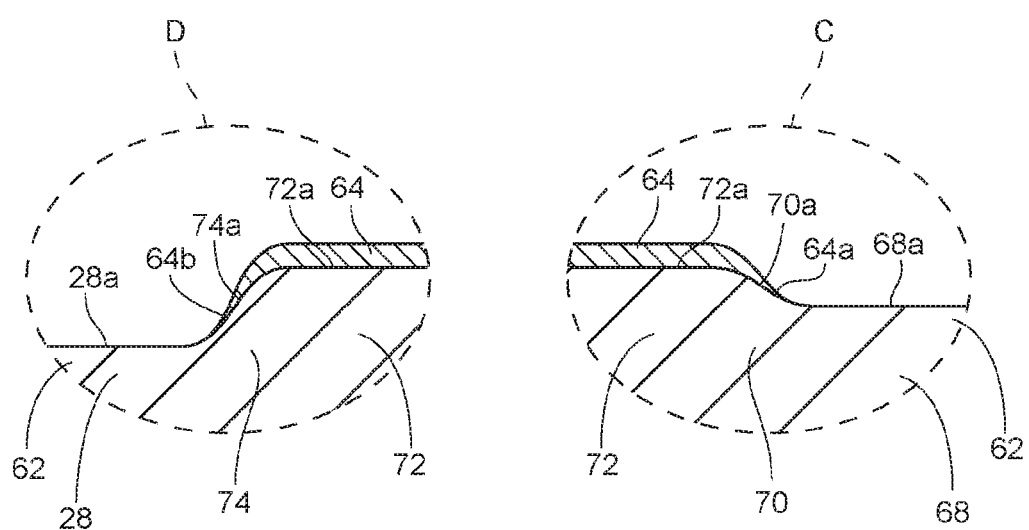
FIG. 9 shows enlarged views illustrating portions surrounded by broken lines in FIG. 8 in an enlarged manner

FIG. 8 is a vertical cross-sectional view illustrating the magnetostrictive unit 60a in cross-section. FIG. 9 shows enlarged views illustrating portions C and D surrounded by broken lines in FIG. 8 in an enlarged manner The magnetostrictive unit 60a is different from the magnetostrictive unit 10a described above in the following aspects. With reference to FIG. 8, the magnetostrictive unit 60a includes a substrate 62 and a plating film 64, instead of the substrate 12 and the plating film 14 of the magnetostrictive unit 10a.

The substrate 62 is different from the substrate 12 described above in the following aspects. With reference to FIG. 8, the substrate 62 includes a holding portion 66, a support portion 68, a tilt portion 70, a plating portion 72 (first base portion), and a tilt portion 74, instead of the support portion 20, the tilt portion 22, the plating portion 24, and the tilt portion 26 of the substrate 12.

With reference to FIG. 8, an outer peripheral surface 66a of the holding portion 66 is a surface parallel to a shaft center of the substrate 62 (see a chain line in FIG. 8) in a cross-section of the substrate 62 including the shaft center and extending in the axial direction of the substrate 62 (hereinafter referred to as a vertical cross-section of the substrate 62). Similarly, an outer peripheral surface 68a of the support portion 68 and an outer peripheral surface 72a of the plating portion 72 are surfaces parallel to the shaft center of the substrate 62 in the vertical cross-section of the substrate 62. The holding portion 66 has a diameter smaller than each of the diameter of the flange portion 18 and the diameter of the support portion 68. With this configuration, a groove 66b is formed between the flange portion 18 and the support portion 68. The plating portion 72 has a diameter larger than the diameter of each of the support portions 68 and 28. In this embodiment, the support portions 68 and 28 correspond to a second base portion, and the outer peripheral surface 72a corresponds to the outer peripheral surface of the first base portion. In this embodiment, the support portion 68 has a diameter larger than each of the diameter of the flange portion 18 and the diameter of the support portion 28.

With reference to FIGS. 8 and 9, the tilt portion 70 is disposed between the support portion 68 and the plating portion 72 in the axial direction of the substrate 62, and connects the support portion 68 and the plating portion 72 to each other. With reference to FIG. 9, an outer peripheral surface 70a of the tilt portion 70 is a slope tilted relative to the shaft center of the substrate 62 in the vertical cross-section of the substrate 62. In this embodiment, the diameter of the tilt portion 70 gradually increases from the support portion 68 toward the plating portion 72. Accordingly, in the vertical cross-section, the outer peripheral surface 70a tilts relative to the shaft center of the substrate 62 radially outward of the substrate 62 from the outer peripheral surface 68a toward the outer peripheral surface 72a.

With reference to FIGS. 8 and 9, the tilt portion 74 is disposed between the support portion 28 and the plating portion 72 in the axial direction of the substrate 62, and connects the support portion 28 and the plating portion 72 to each other. With reference to FIG. 9, an outer peripheral surface 74a of the tilt portion 74 is a slope tilted relative to the shaft center of the substrate 62 in the vertical cross-section of the substrate 62. In this embodiment, the diameter of the tilt portion 74 gradually increases from the support portion 28 toward the plating portion 72. Accordingly, in the vertical cross-section, the outer peripheral surface 74a tilts relative to the shaft center of the substrate 62 radially outward of the substrate 62 from the outer peripheral surface 28a toward the outer peripheral surface 72a.

Each of a connection portion between the outer peripheral surface 70a and the outer peripheral surface 68a and a connection portion between the outer peripheral surface 70a and the outer peripheral surface 72a has a curved shape in the vertical cross-section of the substrate 62. Similarly, each of a connection portion between the outer peripheral surface 74a and the outer peripheral surface 28a and a connection portion between the outer peripheral surface 74a and the outer peripheral surface 72a has a curved shape in the vertical cross-section of the substrate 62.

With reference to FIGS. 8 and 9, the plating film 64 is formed on the outer peripheral surface 72a of the plating portion 72 and the outer peripheral surfaces 70a and 74a of the tilt portions 70 and 74 to have a tubular shape. In this embodiment, with reference to FIG. 9, one end portion 64a of the plating film 64 is located on the outer peripheral surface 70a. The other end portion 64b of the plating film 64 is located on the outer peripheral surface 74a. The thickness of the plating film 64 on the outer peripheral surface 70a and the thickness of the plating film 64 on the outer peripheral surface 74a are smaller than the thickness of the plating film 64 on the outer peripheral surface 72a. The plating film 64 also includes a plurality of slits similar to the plurality of slits 36a and 38a. The thickness of the plating film 64 on the outer peripheral surface 70a, the thickness of the plating film 64 on the outer peripheral surface 74a, and the thickness of the plating film 64 on the outer peripheral surface 72a respectively refer to an average thickness of the plating film 64 on the outer peripheral surface 70a, an average thickness of the plating film 64 on the outer peripheral surface 74a, and an average thickness of the plating film 64 on the outer peripheral surface 72a.

With reference to FIG. 7, the detection unit 60b includes a bobbin 76, detection coils 78a and 78b, a connector 80, a case 82, protective plates 84a and 84b, circlips 86a and 86b, and bearing members 88a and 88b. The bobbin 76, the detection coils 78a and 78b, the connector 80, the case 82, the protective plates 84a and 84b, and the circlips 86a and 86b have configurations similar to those of the bobbin 40, the detection coils 42a and 42b, the connector 44, case 46, the protective plates 48a and 48b, and the circlip 50 of the detection unit 10b, respectively, and thus, detailed description will be omitted.

Each of the bearing members 88a and 88b has an annular shape. Each of the bearing members 88a and 88b is made of, for example, a resin material. The bearing member 88a is fitted in the substrate 62 from one end of the substrate 62. The bearing member 88b is fitted in the substrate 62 from the other end of the substrate 62. In this embodiment, the substrate 62 is rotatably supported indirectly on the bobbin 76 with the bearing members 88a and 88b interposed therebetween. Specifically, in the substrate 62, the outer peripheral surface 68a of the support portion 68 and the outer peripheral surface 28a of the support portion 28 are rotatably supported on the inner peripheral surface of the bobbin 76 with the bearing members 88a and 88b interposed therebetween. The bobbin 76 covers the plating film 64 from radially outside of the substrate 64 not to contact the plating film 64 (see FIG. 8).

The protective plate 84a and the circlip 86a are disposed between the bobbin 76 and a flange portion 18 of the substrate 62. In this embodiment, the protective plate 84a and the circlip 86a are fitted in the groove 66b of the substrate 62 in such a manner that the protective plate 84a contacts one end surface of the bobbin 76. The protective plate 84b is disposed to contact the other end surface of the bobbin 76. The circlip 86b is fitted in the groove 30a of the substrate 62 in such a manner that the circlip 86b contacts one surface of the protective plate 84b (a surface opposite to a surface the bobbin 76 contacts). In this embodiment, the circlips 86a and 86b prevent the bobbin 76 and the bearing members 88a and 88b from falling off from the substrate 62.

Figure 10:
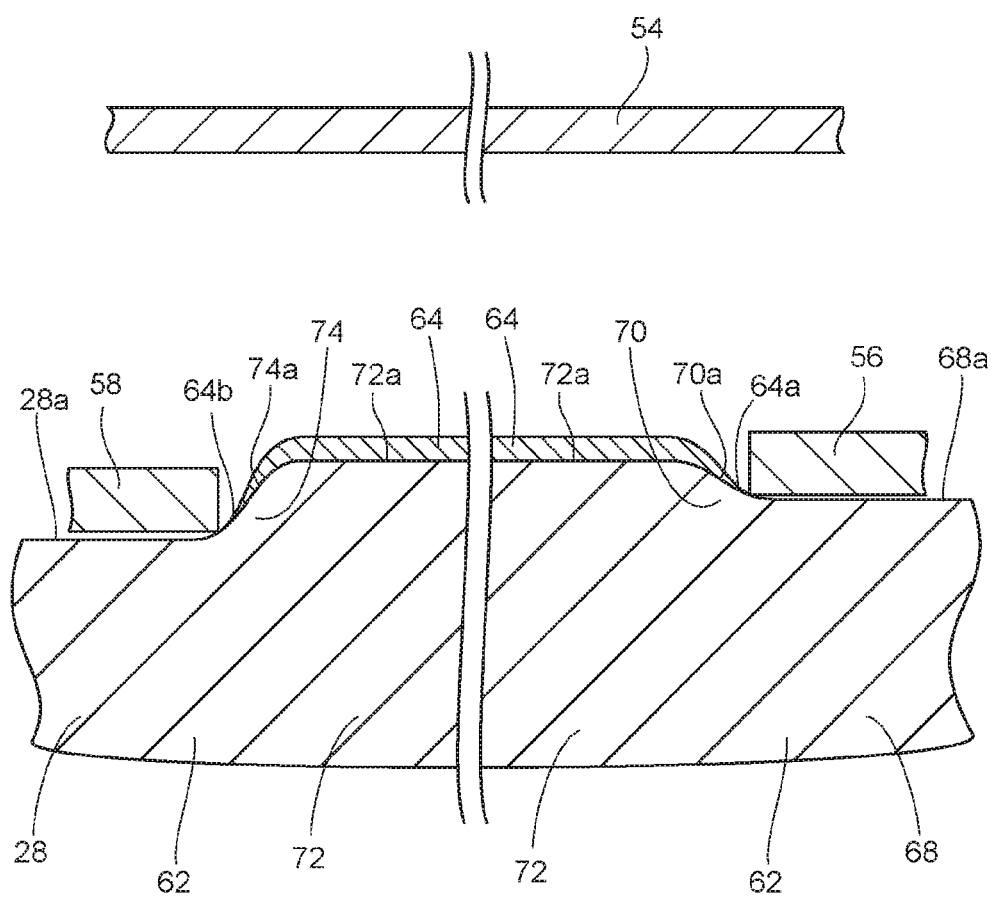
FIG. 10 is a view for describing another example of a method for forming a plating film.

A method for forming the plating film 64 will be briefly described. The plating film 64 is formed by, for example, electroplating. Specifically, for example, as illustrated in FIG. 10, an electrode 54 is disposed radially outside the substrate 62 in a plating solution. Masking members 56 and 58 are used for partially masking outer peripheral surfaces (masking surfaces) 68a and 28a of the support portions 68 and 28 and the outer peripheral surfaces 70a and 74a of the tilt portions 70 and 74. In the example of FIG. 10, the masking members 56 and 58 are disposed to expose large parts of the outer peripheral surfaces 70a and 74a and the outer peripheral surface 72a. After the electrode 54 and the masking members 56 and 58 are disposed as described above, a potential difference is generated between the electrode 54 and the substrate 62. Accordingly, a plating film 64 is formed on the outer peripheral surfaces 70a, 72a, and 74a by metal ions in the plating solution.

As described above, in this embodiment, the plating portion 72 has a diameter larger than the diameters of the support portions (second base portion) 68 and 28, and the diameters of the tilt portions 70 and 74 gradually increase from the support portions 68 and 28 toward the plating portion 72. Here, with reference to FIG. 10, in general, an electric resistance of the plating solution between the electrode 54 and the substrate 62 decreases as the distance between the electrode 54 and the substrate 62 decreases. Thus, the plating film 64 grows with higher priority in a portion of the outer peripheral surface of the substrate 62 close to the electrode 54. In the substrate 62, the plating portion 72 has a diameter larger than the diameter of each of the tilt portions 70 and 74. Accordingly, the distance between the electrode 54 and the outer peripheral surface (outer peripheral surface of the first base portion) 72a of the plating portion 72 is smaller than the distance between the electrode 54 and the outer peripheral surfaces (slopes) 70a and 74a of the tilt portions 70 and 74. In this manner, an electric resistance of the plating solution between the electrode 54 and the outer peripheral surface 72a is smaller than an electric resistance of the plating solution between the electrode 54 and the outer peripheral surfaces 70a and 74a. Consequently, the plating film 64 can grow with higher priority on the outer peripheral surface 72a than on the outer peripheral surfaces 70a and 74a. In other words, the growth of the plating film 64 on the outer peripheral surfaces 70a and 74a can be made slower than the growth of the plating film 64 on the outer peripheral surface 72a. In this manner, the thicknesses of the plating film 64 on the outer peripheral surfaces 70a and 74a can be easily made smaller than the thickness of the plating film 64 on the outer peripheral surface 72a. That is, without masking the substrate 62 with high accuracy in order to control the thicknesses of the end portions 64a and 64b of the plating film 64, the thicknesses of the end portions 64a and 64b can be easily made smaller than the thickness of the plating film 64 on the outer peripheral surface 72a.

In addition, as described above, the diameters of the tilt portions 70 and 74 gradually increase from the support portions 68 and 28 toward the plating portion 72. In this case, the distance between the electrode 54 and the outer peripheral surfaces 70a and 74a in the radial direction of the substrate 62 gradually increases toward the support portions 68 and 28 in the axial direction of the substrate 62. That is, an electric resistance of the plating solution between the electrode 54 and the outer peripheral surfaces 70a and 74a gradually increases toward the support portions 68 and 28 in the axial direction of the substrate 62. Accordingly, the growth of the plating film 64 on the outer peripheral surfaces 70a and 74a becomes slower toward the support portions 68 and 28. In this manner, the thickness of the plating film 64 formed on the outer peripheral surfaces 70a and 74a can be made smaller toward the support portions 68 and 28. This further ensures reduction of the thicknesses of the end portions 64a and 64b of the plating film 64.

In the foregoing manner, in this embodiment, without masking the substrate 62 with high accuracy in forming the plating film 64, the occurrence of variations in outputs of the torque sensor 60 can be reduced similarly to the embodiment described above. That is, both enhancement of productivity and reduction of variations in outputs of the torque sensor 60 can be achieved.

In this embodiment, a connection portion between the outer peripheral surface (slope) 70a of the tilt portion 70 and the outer peripheral surface (outer peripheral surface of the first base portion) 72a of the plating portion 72 has a curved shape in the vertical cross-section of the substrate 62. Similarly, a connection portion between the outer peripheral surface (slope) 74a of the tilt portion 74 and the outer peripheral surface (outer peripheral surface of the first base portion) 72a of the plating portion 72 has a curved shape in the vertical cross-section of the substrate 62. Here, in the substrate 62 in which the outer peripheral surface (outer peripheral surface of the first base portion) 72a projects from the outer peripheral surfaces (masking surfaces) 68a and 28a, if the connection portion has a sharp edge in some cases, the thickness of the plating film 64 can increase at this sharp edge. However, in this embodiment, an increase in the thickness of the plating film 64 in the connection portion can be prevented by forming the connection portion to have a curved shape in the vertical cross-section of the substrate 62. In this manner, it is possible to prevent unevenness of a magnetic flux passing through a region of the plating film 64 near the connection portion. As a result, variations in outputs of the torque sensor 60 can be sufficiently reduced.

Although the embodiment described above is directed to the case of using the tubular substrates 12 and 62, a columnar substrate may be used.

The embodiment described above is directed to the case where the outer peripheral surfaces (masking surfaces) of the support portions 20, 28, and 68 (second base portion) are surfaces parallel to the shaft centers of the substrates 12 and 62 in the vertical cross-sections of the substrates 12 and 62. However, the outer peripheral surfaces of the support portions may be tilted relative to the shaft centers of the substrates in the vertical cross-sections of the substrates.

In the embodiment described above, the tilt portions 22, 26, 70, and 74 are disposed between the support portions 20 and 68 and the plating portions 24 and 72 and between the support portion 28 and the plating portions 24 and 72 in the axial directions of the substrates 12 and 62, respectively. However, the tilt portion may be provided only one of between the support portion 20 and the plating portion 24 or between the support portion 28 and the plating portion 24.

In the embodiment described above, each of the connection portions between the outer peripheral surfaces 22a and 70a and the outer peripheral surfaces 20a and 68a, the connection portions between the outer peripheral surfaces 22a and 70a and the outer peripheral surfaces 24a and 72a, the connection portions between the outer peripheral surfaces 26a and 74a and the outer peripheral surface 28a, and the connection portions between the outer peripheral surfaces 26a and 74a and the outer peripheral surfaces 24a and 72a has a curved shape in the vertical cross-section of the substrate 62. However, some or all of these connection portions may not have curved shapes but may have shapes other than curved shapes, such as linear shapes, in the vertical cross-sections of the substrates 12 and 62.

The configurations of the bobbins 40 and 76 and the cases 46 and 82 of the torque sensors 10 and 60 described in the above embodiments are examples. Accordingly, the bobbins 40 and 76 and the cases 46 and 82 may have any configuration as long as magnetic fluxes passing through the magnetostrictive portions 36 and 38 can be generated by the detection coils 42a, 42b, 78a, and 78b. The connection configuration between the magnetostrictive unit 10a and the detection unit 10b is not limited to the configuration of the embodiment described above, and may be any configuration as long as the magnetostrictive unit 10a and the detection unit 10b can be connected to each other.

The embodiment described above is directed to the case of applying the present teaching to torque sensors, but the present teaching is applicable to various magnetostrictive sensors. For example, the present teaching may be applied to a magnetostrictive displacement sensor and may be applied to a magnetostrictive load sensor.

INDUSTRIAL APPLICABILITY

The present teaching can be used for various magnetostrictive sensors for detecting changes in the magnetic permeability of a plating film.

The invention claimed is:

1. A magnetostrictive sensor comprising:
    a substrate having a columnar or tubular shape, the substrate including a first base portion, a second base portion, and a tilt portion disposed between the first base portion and the second base portion in an axial direction of the substrate and connecting the first base portion and the second base portion, the substrate further including a shaft center extending axially along a center of the substrate in a side cross-sectional view of the substrate; and
    a plating film disposed on an outer peripheral surface of the substrate, wherein
    the first base portion has an outer peripheral surface parallel to the shaft center of the substrate,
    the tilt portion has an outer peripheral surface being a slope tilted relative to the shaft center in the side cross-sectional view,
    the plating film is formed on the outer peripheral surface of the first base portion and on the slope in such a manner that one end of the plating film in the axial direction is located on the slope, and
    the plating film has a thickness on the slope smaller than a thickness of the plating film on the outer peripheral surface of the first base portion.

2. The magnetostrictive sensor of claim 1, wherein a diameter of the tilt portion gradually decreases from the second base portion toward the first base portion.

3. The magnetostrictive sensor of claim 2, wherein a connection portion between the slope and an outer peripheral surface of the second base portion has a curved shape in the side cross-sectional view.

4. The magnetostrictive sensor of claim 1, wherein a diameter of the tilt portion gradually increases from the second base portion toward the first base portion.

5. The magnetostrictive sensor of claim 4, wherein a connection portion between the slope and the outer peripheral surface of the first base portion has a curved shape in the side cross-sectional view.

6. The magnetostrictive sensor of claim 1, wherein
    the substrate comprises a pair of the tilt portions and a pair of the second base portions,
    in the axial direction, one of the pair of tilt portions is connected to one end of the first base portion, and the other one of the pair of tilt portions is connected to the other end of the first base portion,
    one of the pair of second base portions is connected to the one of the tilt portions, and the other one of the pair of second portions is connected to the other one of the tilt portions,
    one end of the plating film in the axial direction is formed on a slope of the one of the tilt portions, and the other end of the plating film in the axial direction is formed on a slope of the other one of the tilt portions, and
    each of the one and the other ends of the plating film has a thickness smaller than a thickness of the plating film on the outer peripheral surface of the first base portion.

7. The magnetostrictive sensor of claim 1, further comprising:
    a detection coil arranged radially outward of the plating film that detects a change in a magnetic permeability of the plating film; and
    a tubular bobbin which holds the detection coil and in which the substrate is inserted, wherein
    the tubular bobbin covers the plating film radially outward of the substrate, and
    the second base portion of the substrate is rotatably supported on an inner peripheral surface of the tubular bobbin.

* * * * *